(12) United States Patent
Kikuchi

(10) Patent No.: US 6,452,665 B1
(45) Date of Patent: Sep. 17, 2002

(54) OBJECT DETECTING SYSTEM

(75) Inventor: Hayato Kikuchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/635,231

(22) Filed: Aug. 9, 2000

(30) Foreign Application Priority Data

Aug. 10, 1999 (JP) .......................................... 11-226545

(51) Int. Cl.[7] .............................. G01C 3/08; B60T 7/16; G01S 13/00; G01B 11/26

(52) U.S. Cl. ................... 356/4.01; 180/169; 356/141.1; 342/91

(58) Field of Search ...................... 356/4.01, 5.01–5.15, 356/141.1; 382/106; 180/169; 342/91

(56) References Cited

U.S. PATENT DOCUMENTS 5,319,611 A * 6/1994 Korba
5,959,739 A * 9/1999 Green et al.

FOREIGN PATENT DOCUMENTS

JP      57-184985    * 7/1980

* cited by examiner

Primary Examiner—Stephen C. Buczinski
(74) Attorney, Agent, or Firm—Arent Fox Kintner Plotkin & Kahn

(57) ABSTRACT

In an object detecting system, a first discriminating unit discriminates an object which has a reflected wave having a reception level calculated by a reception level calculating unit, equal to or larger than a first reference level. A second discriminating unit discriminates an object, the distance to which, calculated by a distance calculated unit, is equal to the distance to the object discriminated by the first discriminating unit, and which has a reflected wave whose reception level calculated by the reception level calculating unit is equal to or smaller than a second reference level. A virtual image determining unit determines the object discriminated by the second discriminating unit as a virtual image of the actual existing object discriminated by the first discriminating unit. A virtual image deleting unit deletes the virtual image from the result of the recognition provided by an object recognizing unit, whereby only the actual existing object including no virtual image can be detected correctly. Therefore, it is possible to prevent the misdetection of an object due to a ghost beam generated by the deposition of ice or the like on a light transmitting face.

19 Claims, 10 Drawing Sheets

OBJECT DETECTING SYSTEM

BACKGROUND OF THE INVENTION

1. Field of the Invention

The present invention relates to an object detecting system for detecting an object by transmitting an electromagnetic wave such as laser and the like toward the object and receiving a reflected wave from the object.

2. Description of the Related Art

FIG. 9 shows a prior art object detecting system mounted in a vehicle for detecting the position of a vehicle traveling ahead of the vehicle with the detection system (which will be referred to as a preceding vehicle hereinafter), and the distance between the vehicle and the preceding vehicle. A vertically elongated transmitted beam B is reciprocally moved laterally with its lateral width limited, by reflecting a laser beam transmitted by a laser diode LD, from a mirror M reciprocally turned about a rotational axis S. A reflected wave R resulting from the reflection of the transmitted beam from an object is caught in a fixed receiving area and received by a photodiode PD. The distance from the vehicle to the object can be detected, based on the time lapsed from the transmission of the beam B to the reception of the reflected wave R, and the direction of the object can be detected, based on the direction of the transmitted beam B at that time.

The transmitted beam from such object detecting system is transmitted through a glass surface G for protecting the laser and mirror from dust and water. However, when an ice crystal is deposited on the glass surface G contacting with open air, as shown in FIG. 10, the crystal acts as a prism to divert a portion of the transmitted beam in a different direction, whereby the original transmitted beam and a ghost beam weaker than the original transmitted beam, may be transmitted simultaneously in some cases. As a result, there is a possibility that a reflected wave resulting from the reflection of the transmitted beam from the object and a reflected wave resulting from the reflection of the ghost beam from the object are received in the photodiode, whereby a non-existing virtual image is detected in addition to the original object.

Suppose that an object to be detected exists in front of a vehicle and there is a ghost beam generated and offset leftwards from the transmitted beam by an angle 2, as shown in FIGS. 11A and 11B. In this case, when a reflected wave resulting from the reflection of the beam transmitted toward the front of the vehicle, is received in the course of movement of the transmitted beam and the ghost beam in a direction of an arrow a from the left to the right, an object existing in front of the vehicle is detected (see FIG. 11A). When the ghost beam is then transmitted toward the front of the vehicle with a slight time lag, the reflected wave resulting from the reflection of the ghost beam from the object is received. At this time, the transmitted beam faces rightwards at the angle 2 from the front and moreover, the object detecting system recognizes the direction of the object as the direction of the transmitted beam. For this reason, the virtual image of the object is detected on the right from the front of the vehicle by the reflected wave of the ghost beam (see FIG. 11B). As a result, although, in fact, only a single object exists in front of the vehicle, the two objects are misdetected as if they exist in front of the vehicle and on the right from the front of the vehicle, respectively.

Further, there is a possibility that the ghost beam is generated not only when an ice crystal has been deposited on the glass surface G, but also when the glass surface G has been flawed and when a transparent seal has been affixed onto the glass surface G.

SUMMARY OF THE INVENTION

Accordingly, it is an object of the present invention to prevent the misdetection of an object due to a ghost beam.

To achieve the above object, according to a first aspect and feature of the present invention, there is provided an object detecting system for detecting the presence of an object by transmitting an electromagnetic wave and receiving a reflected wave resulting from the reflection of the electromagnetic wave from the object, comprising an object recognizing means for recognizing an object, based on the result of the reception of the reflected wave, and a virtual image determining means for determining a virtual image of the object, based on a comparison of a plurality of results of the recognition provided by the object recognizing means.

With the above arrangement, the object is recognized based on the result of the reception of the reflected wave of the electromagnetic wave transmitted toward the object, and hence, the virtual image due to the ghost beam can be determined based on the comparison of the plurality of results of the recognition. Therefore, a virtual image can be prevented from being misdetected as an actually existing object.

According to a second aspect and feature of the present invention, the object detecting system further includes a virtual image deleting means for deleting the object determined as the virtual image by the virtual image determining means, from the results of the recognition provided by the object recognizing means.

With the above arrangement, the object determined as the virtual image is deleted from the results of the recognition, provided by the object recognizing means and therefore, only the actually existing object including no virtual image, can be detected correctly.

According to a third aspect and feature of the present invention, there is provided an object detecting system for detecting the presence of an object by transmitting an electromagnetic wave and receiving a reflected wave resulting from the reflection of the electromagnetic wave from the object, comprising a first discriminating means for discriminating an object having a reflected wave with a reception level equal to or larger than a first reference level, a second discriminating means for discriminating an object which existing at a distance equal to the distance to the object, discriminated by the first discriminating means and having a reflected wave with a reception level equal to or smaller than a second reference level, and a virtual image determining means for determining the object discriminated by the second discriminating means is a virtual image of the object discriminated by the first discriminating means.

With the above arrangement, an object having a reflected wave with a reception level equal to or larger than the first reference level, is recognized as an actually existing object, and an object existing at a distance equal to the distance to the actually existing object and having a reflected wave with a reception level equal to or smaller than the second reference level, is recognized as a virtual image of the actually existing object. Therefore, it is possible to reliably discriminate the actually existing object and the virtual image thereby prevent the occurrence of the misdetection.

According to a fourth aspect and feature of the present invention, the first reference level of the first discriminating means is set larger than the second reference level of the second discriminating means.

With the above arrangement, the first reference level is set larger than the second reference level and hence, it prevents misdetection of an actual existing object as a virtual image and misdetection of a virtual image as an actual existing object.

According to a fifth aspect and feature of the present invention, the first reference level of the first discriminating means is set such that it is smaller as the distance to an object is larger.

With the above arrangement, the first reference level is set such that it is smaller as the distance to an object is larger and therefore, an accurate determination can be achieved in consideration of attenuation of the reflected wave, with an increase in distance to an object.

According to a sixth aspect and feature of the present invention, the second reference level of the second discriminating means, is set such that it is smaller as the distance to an object is larger.

With the above arrangement, the second reference level is set such that it is smaller, as the distance to an object is larger and therefore, an accurate determination can be achieved in consideration of the attenuation of the reflected wave, with an increase in distance to an object.

According to a seventh aspect and feature of the present invention, the virtual image determining means conducts the determination for an object, when the distance to the object is shorter than a predetermined value.

With the above arrangement, the virtual image determining means conducts the determination of a virtual image only for an object when the distance to the object is shorter than a predetermined value. Therefore, it is possible to prevent the low-accuracy determination of a virtual image by a reflected wave of an originally weak ghost beam for an actual weak object existing farther away.

According to an eighth aspect and feature of the present invention, there is provided an object detecting system for detecting the presence of an object by transmitting an electromagnetic wave and receiving a reflected wave resulting from the reflection of the electromagnetic wave from the object, comprising a first discriminating means for discriminating an object having a reflected wave with a reception level equal to or larger than a first reference level, a third discriminating means for discriminating an object existing at a distance equal to the distance to the object discriminated by the first discriminating means and having a reflected wave with a reception level smaller than the reception level of the object by a predetermined value or more, and a virtual image determining means for determining the object discriminated by the third discriminating means is a virtual image of the object discriminated by the first discriminating means.

With the above arrangement, an object having a reflected wave with a reception level equal to or larger than the first reference level is discriminated as an actual existing object, and an object existing at a distance equivalent to the distance to the actual existing object and having a reflected wave with a reception level smaller than the reception level of the actual existing object by a predetermined value or more, is discriminated as a virtual image of the actual existing object. Therefore, it is possible to reliably discriminate the actual existing object and the virtual image to prevent the occurrence of a misdetection.

According to a ninth aspect and feature of the present invention, there is provided an object detecting system for detecting the presence of an object by transmitting an electromagnetic wave and receiving a reflected wave resulting from the reflection of the electromagnetic wave from the object: comprising a first discriminating means for discriminating an object having a reflected wave with a reception level equal to or larger than a first reference level, a second discriminating means for discriminating an object existing at a distance equal to the distance to the object discriminated by the first discriminating means and having a reflected wave with a reception level smaller than the reception level of the object discriminated by the first discriminating means by a second predetermined value and with a reception level equal to or smaller than a second reference level, and a virtual image determining means for determining the object discriminated by the second discriminating means as a virtual image of the object discriminated by the first discriminating means.

With the above arrangement, an object having a reflected wave with a reception level equal to or larger than the first reference level is recognized as a actual existing object, and an object existing at a distance equal to the distance to the actual existing object and providing a reflected wave with a reception level smaller than the reception level of the actual existing object by the second predetermined level and equal to or smaller than the second reception level, is recognized as a virtual image of the actual existing object. Therefore, it is possible to reliably discriminate the actual existing object and the virtual image to prevent the occurrence of the misdetection.

The above and other objects, features and advantages of the invention will become apparent from the following description of the preferred embodiment taken in conjunction with the accompanying drawings.

BRIEF DESCRIPTION OF THE DRAWINGS

FIGS. 1 to 8 show an embodiment of the present invention, wherein

FIG. 1 is a block diagram of an object detecting system.

FIG. 2 is a perspective view of the object detecting system.

FIG. 3 is a block diagram of a distance measuring section.

FIG. 4 is a flow chart of a main routine.

FIG. 5 is a first portion of a flow chart of a virtual image determining and deleting routine.

FIG. 6 is a second portion of the flow chart of the virtual image determining and deleting routine.

FIG. 7 is a graph showing a first reference level $L_{REF1}$ and a second reference level $L_{REF2}$.

FIG. 8 is a diagram showing one example of the result of the detection of an object including a virtual image.

DESCRIPTION OF THE PREFERRED EMBODIMENT

The present invention will now be described by way of an embodiment with reference to the accompanying drawings.

FIGS. 1 to 8 show an embodiment of the present invention.

Figure 1:
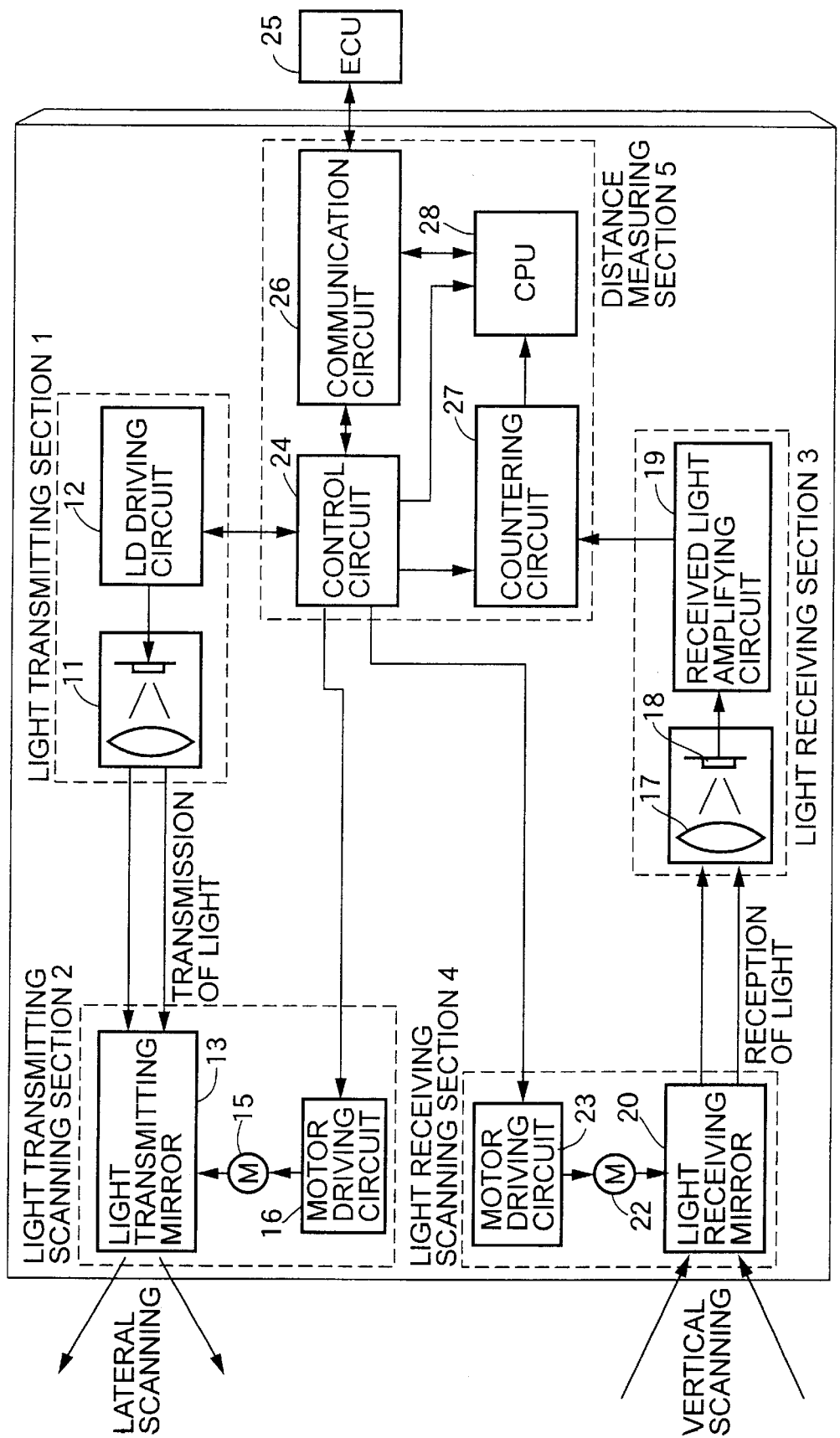
Figure 2:
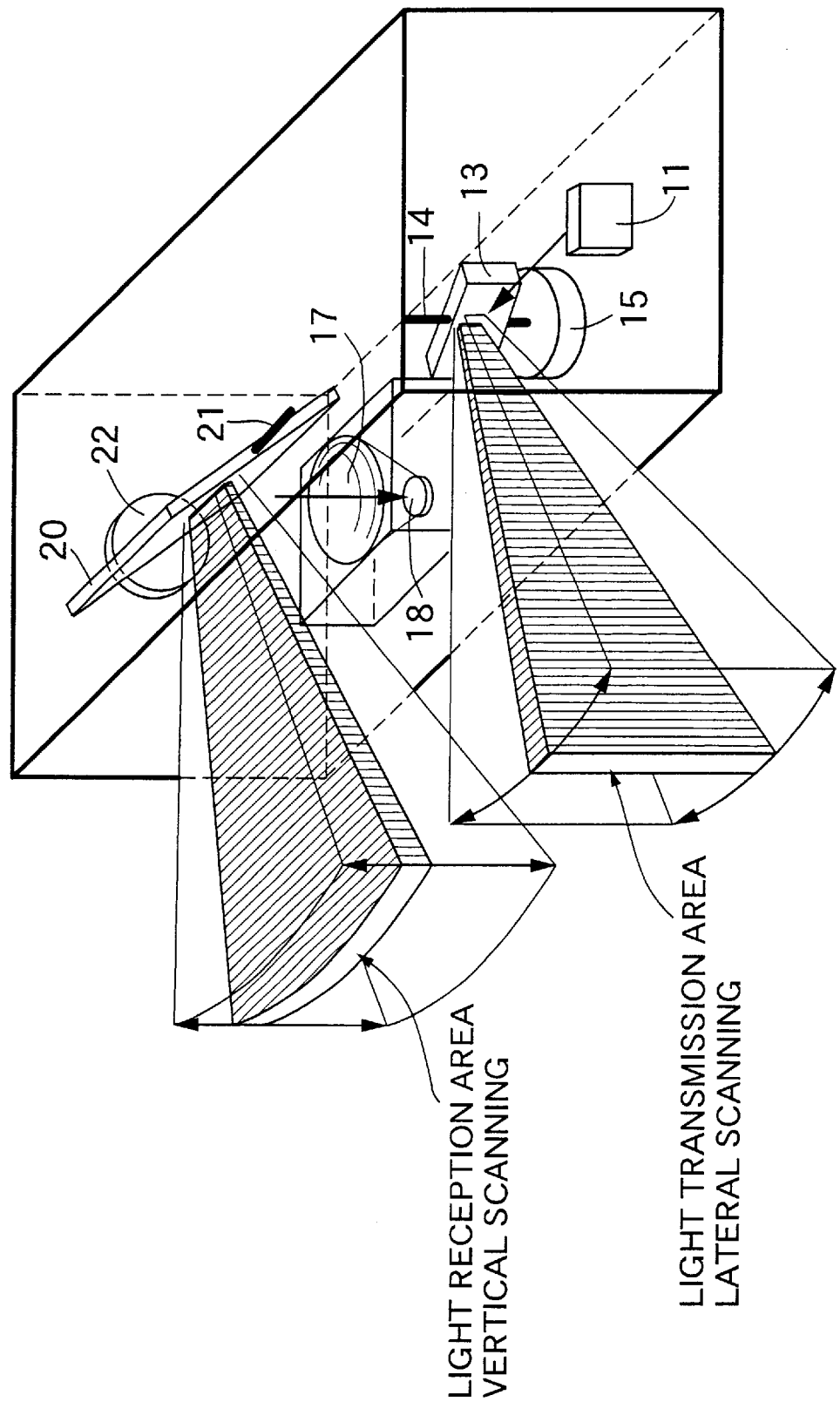

As shown in FIGS. 1 and 2, an object detecting system for detecting the distance from a vehicle to an object (which will be referred merely to as the distance to the object hereinafter) and a direction of such object, for example, such as a vehicle traveling ahead of the vehicle (which will be referred to as a preceding vehicle hereinafter), is comprised of a light transmitting section 1, a light transmitting and scanning section 2, a light receiving section 3, a light receiving and scanning section 4, and a distance measuring section 5. The light transmitting section 1 includes a laser diode 11 integrally provided with a light transmitting lens, and a laser diode driving circuit 12 for driving the laser diode 11. The light transmitting and scanning section 2 includes a light transmitting mirror 13 for reflecting the laser output from the laser diode 11, a motor for reciprocally turning the light transmitting mirror 13 about a vertical axis 14, and a motor driving circuit 16 for controlling the driving of the motor 15. A beam delivered from the light transmitting mirror 13 has a vertically elongated pattern as a result of the limitation of the lateral width thereof, and is reciprocally moved laterally at a predetermined period to scan an object.

The light receiving section 3 includes a light receiving lens 17, a photodiode 18 for receiving a reflected wave focused by the light receiving lens 17 to convert it into an electrical signal, and a received light amplifying circuit 19 for amplifying the output from the photodiode 18. The light receiving and scanning section 4 includes a light receiving mirror 20 for reflecting a wave reflected from an object, to deliver it to the photodiode 18, a motor 22 for reciprocally turning the light receiving mirror 2 about a lateral axis 21, and a motor driving circuit 23 for controlling the driving of the motor 22. A light reception area having a laterally elongated pattern as a result of the limitation of the vertical width thereof is vertically, reciprocally moved at a predetermined period, by the light receiving mirror 20, to scan an object.

The distance measuring section 5 includes a control circuit 24 for controlling the laser diode driving circuit 12 and the motor driving circuits 16 and 23, a communication circuit 26 for communicating with an electronic control unit 25 for controlling a cruise control system and an automatic braking device, a counting circuit 27 for counting the time lapsed from the transmission of the laser to the reception of the laser, and a central calculating and processing unit 28 for calculating the distance and direction of an object and determining a virtual image due to a ghost beam, to delete it from detected objects.

An area where a vertically elongated transmitted beam intersects a laterally elongated light reception area is a detection area. The detection area has a lateral width equal to a lateral scanning width of the transmitted beam, and is moved in a zigzag manner over an entire detection region having a vertical width equal to a lateral scanning width of the light receiving area to scan an object. Thus, a distance to an object is detected, based on a time lapsed from the transmission of the beam to the reception of a reflected wave resulting from the reflection of the transmitted beam by the object, and a direction of the object is detected based on the direction of an instantaneous detection area at that time.

Figure 3:
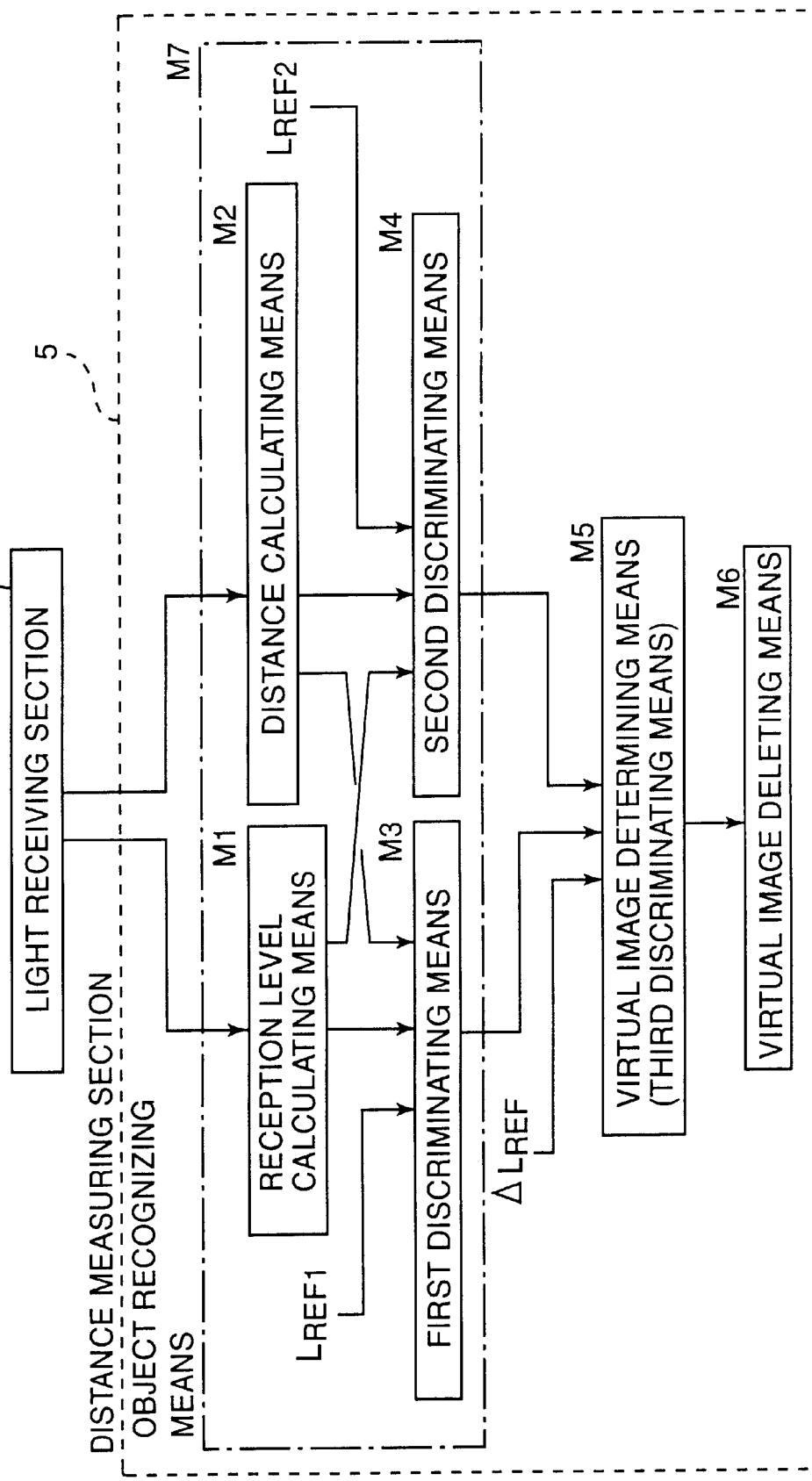

As shown in FIG. 3, the distance measuring section 5 includes a reception-level calculating means M1, a distance calculating means M2, a first discriminating means M3, a second discriminating means M4, a virtual image determining means (third discriminating means) M5, and a virtual image deleting means M6. The reception-level calculating means M1, the distance calculating means M2, the first discriminating means M3 and the second discriminating means M4 comprises an object recognizing means M7.

The reception-level calculating means M1 classifies the reception intensity of the wave reflected from the object and received by the light receiving section 3 into sixteen reception levels $L_1$ to $L_{16}$. The reception levels $L_1$ to $L_{16}$ are gradually larger from the lowest reception level $L_1$ to the highest reception level $L_{16}$. The distance calculating means M2 calculates the distance to the object, based on the time lapsed from the transmission of the laser to the reception of the laser.

TABLE 1

| Distance | Reception level of target which may be possibly origin | Reception level of target which may be possibly virtual image |
| --- | --- | --- |
| <10 m | Equal to or larger than $L_{12}$ | Equal to or smaller than $L_8$ |
| <15 m | Equal to or larger than $L_{11}$ | Equal to or smaller than $L_7$ |
| <20 m | Equal to or larger than $L_{10}$ | Equal to or smaller than $L_6$ |
| <25 m | Equal to or larger than $L_9$ | Equal to or smaller than $L_5$ |
| <30 m | Equal to or larger than $L_8$ | Equal to or smaller than $L_4$ |
| <35 m | Equal to or larger than $L_7$ | Equal to or smaller than $L_3$ |
| <40 m | Equal to or larger than $L_6$ | Equal to or smaller than $L_2$ |
| 40 m # | — | — |

The first discriminating means M3 selects and discriminates such an object that the reception level (one of $L_1$ to $L_{16}$) is equal to or larger than the first reference level $L_{REF1}$ as a result of comparison of the reception level (one of $L_1$ to $L_{16}$) of the object calculated in the reception level calculating means M1 with the first reference level $L_{REF1}$, and the distance calculated in the distance calculating means M2 is shorter than 40 m. As apparent from Table 1 and FIG. 7, the first reference level $L_{REF1}$ is a function of the distance to an object and is decreased linearly from the reception level $L_{12}$ at the distance of 10 m to the reception level $L_6$ at the distance of 40 m $L_{REF2}$.

The second discriminating means M4 selects and discriminates such an object that the distance calculated in the distance calculating means M2 is substantially equivalent to the distance to the object discriminated by the first discriminating means M3 (a difference between the distances is equal to or smaller than 0.75 m), and the reception level (one of $L_1$ to $L_{16}$) is equal to or smaller than a second reference level $L_{REF2}$ as a result of the comparison of the reception level (one of $L_1$ to $L_{16}$) of the object calculated in the reception level calculating means M1 with the second reference level $L_{REF2}$ that is equal to or smaller than the first reference level $L_{REF1}$. As apparent from Table 1 and FIG. 7, the second reference level $L_{REF2}$ is decreased linearly from the reception level $L_8$ at the distance of 10 m to the reception level $L_2$ at the distance of 40 m, and extends with a difference of four levels below the first reference level $L_{REF1}$ and in parallel to the first reference level $L_{REF1}$.

If the first and second discriminating means M3 and M4 then discriminate two objects corresponding to each other, the virtual image determining means M5 determines that one of the two objects discriminated by the second discriminating means M4 is a virtual image. More specifically, if the first discriminating means M3 discriminates an object, the distance to which is shorter than 40 mm and whose reception level $L_1$ to $L_{16}$ is equal to or larger than the first reference level $L_{REF1}$, and the second discriminating means M4 discriminates an object, the distance to which is equivalent to the distance to the object recognized by the first discriminating means M3 and whose reception level $L_1$ to $L_{16}$ is equal to or smaller than the second reception level $L_{REF2}$ (namely, is smaller than that of the object discriminated by the first discriminating means M3 by four levels), it is determined by the virtual image determining means M4 that the object discriminated by the first discriminating means M3 is an actual existing object, and the object discriminated by the second discriminating means M4 is a virtual image of the actually existing object.

When the virtual image determining means M5 has determined the virtual image of the actual existing object in the above manner, the virtual image deleting means M6 deletes the virtual image, whereby the misdetection of an object due to a ghost beam can be prevented.

In this manner, the actual existing object and the virtual image thereof can be reliably discriminated by considering that the reception level of the wave reflected from the object is decreased with the increase in distance to the object, and by decreasing the first and second reference levels $L_{REF1}$ and $L_{REF2}$ with the increase in distance to the object. In addition, the virtual image of the actual existing object is discriminated under the condition that the distance to the virtual image is equivalent to the distance to the actual existing object and hence, an actual existing object can be prevented from being misdetected as a virtual image. Further, the reflected wave of a ghost beam initially weaker than the transmitted beam, is considerably weaker and hence, it is seldom that the virtual image of an object, the distance to which is 40 m, is clearly detected. Therefore, if the determination of the virtual image is limited to an area where the distance is equal to or shorter than 40 m, and thus, the load of calculation of the central calculating and processing unit 28 can be alleviated.

Figure 8:
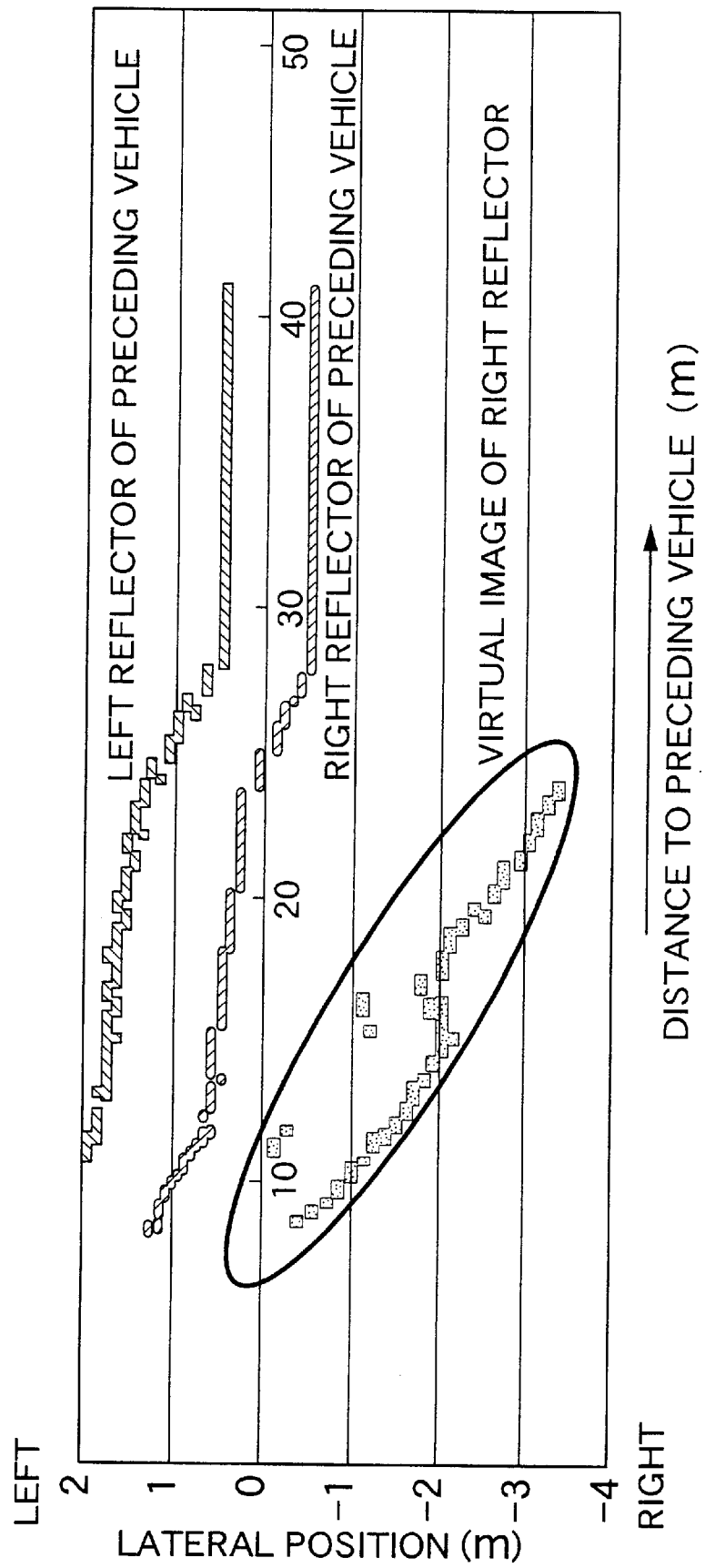
Figure 9:
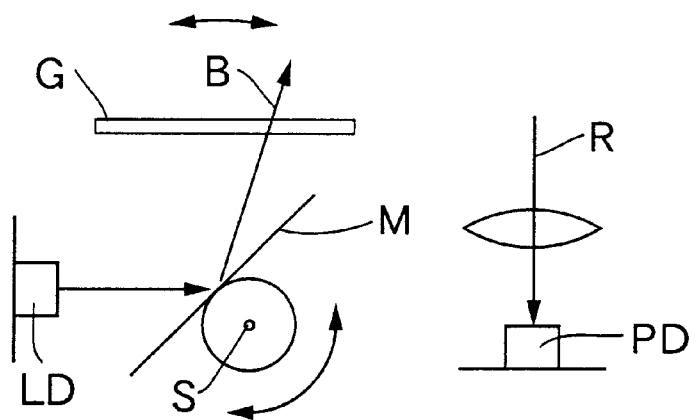
FIG. 9 is an illustration showing a prior art object detecting system.
Figure 10:
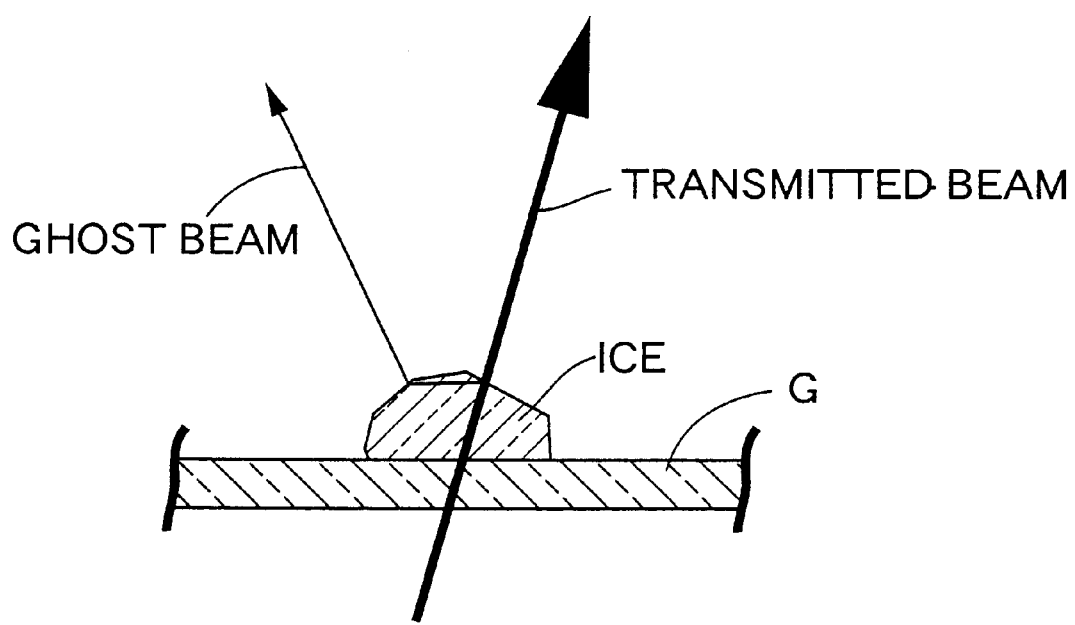
FIG. 10 is an illustration for explaining the reason why a ghost beam is generated.
Figure 11B:
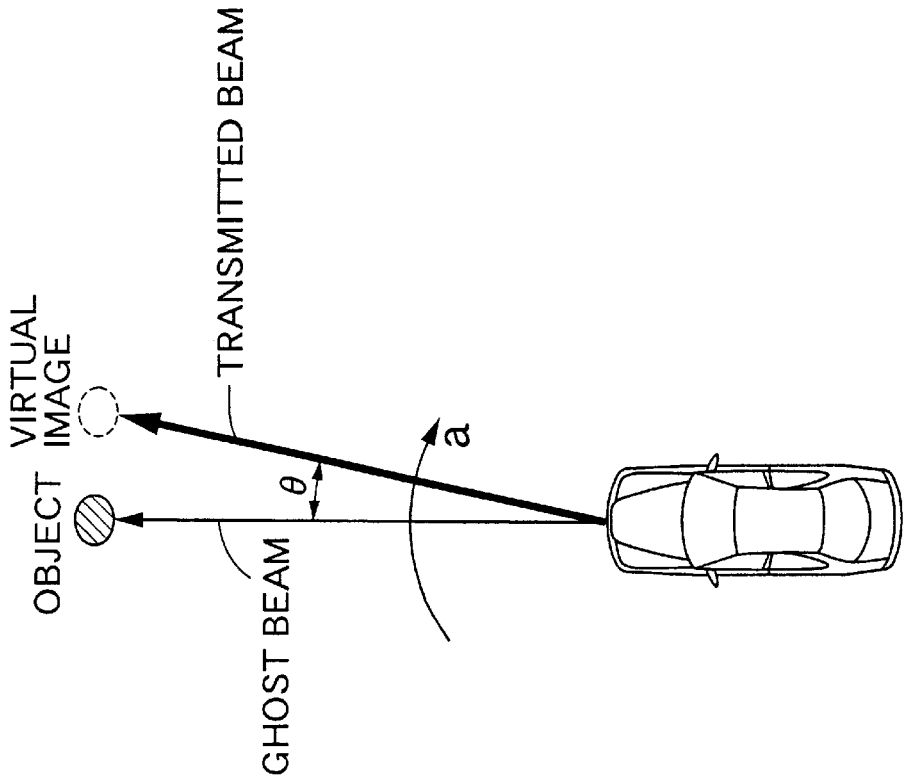
FIGS. 11A and 11B are illustrations for explaining the reason why a virtual image is detected due to a ghost beam.
Figure 11A:
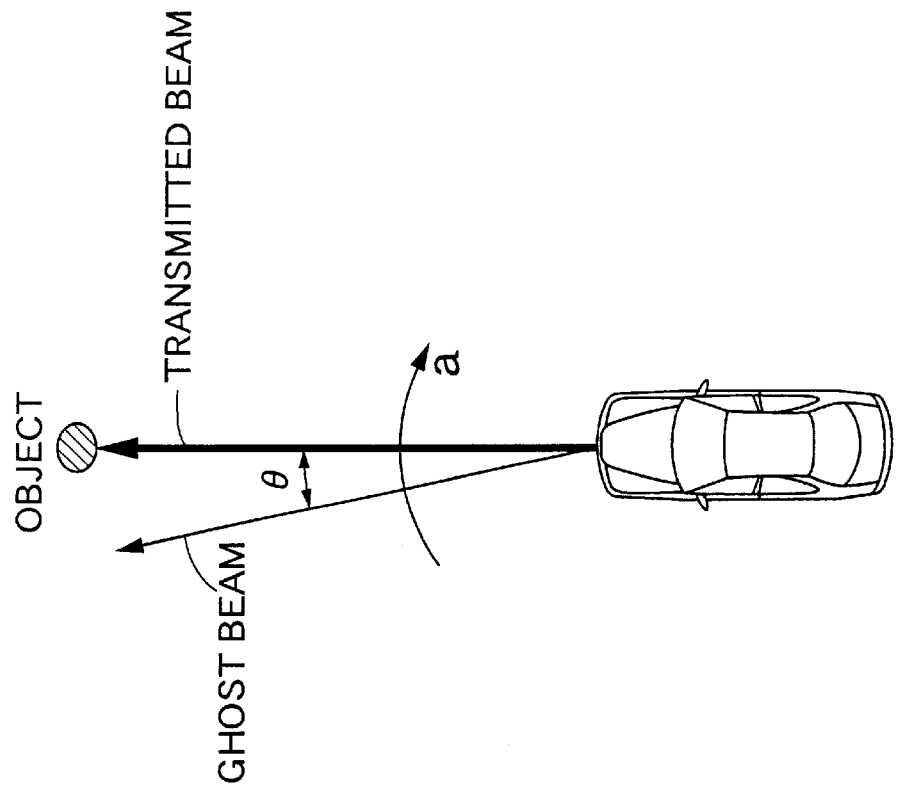

FIG. 8 shows the results of detection by the object detecting system, when a vehicle traveling ahead of the vehicle and on the left of the vehicle changes its lane to the front of the vehicle, while being accelerated. When the preceding vehicle is accelerated to enter the detection area capable of being detected by the object detecting system of the vehicle, left and right reflectors of the preceding vehicle are detected, and the positions of the detected reflectors are displaced to positions in front of the vehicle with the change of lane conducted by the preceding vehicle. When a ghost beam exists in addition to the beam transmitted by the object detecting system, and the virtual image of the right reflector of the preceding vehicle is detected as in an area surrounded by an ellipse in FIG. 8, the virtual image is misdetected as if it is an object existing on the right of and ahead of the vehicle. The reason why the virtual image has disappeared at a point of a relative distance of 25 m to the preceding vehicle is that the preceding vehicle has been moved away from the vehicle and as a result, the reception level of the reflected wave of the ghost beam is equal to or smaller than a detectable level, or ice causing the generation of the ghost beam has been removed. Thus, according to this embodiment, it is possible to prevent a non-existing object from being misdetected as if it exists, by determining and deleting the virtual image due to the ghost beam.

The outline of the above-described operation will be described with reference to a flow chart in FIG. 4, and the detail of the above-described operation will be described with reference to flow charts in FIGS. 5 and 6.

Figure 4:
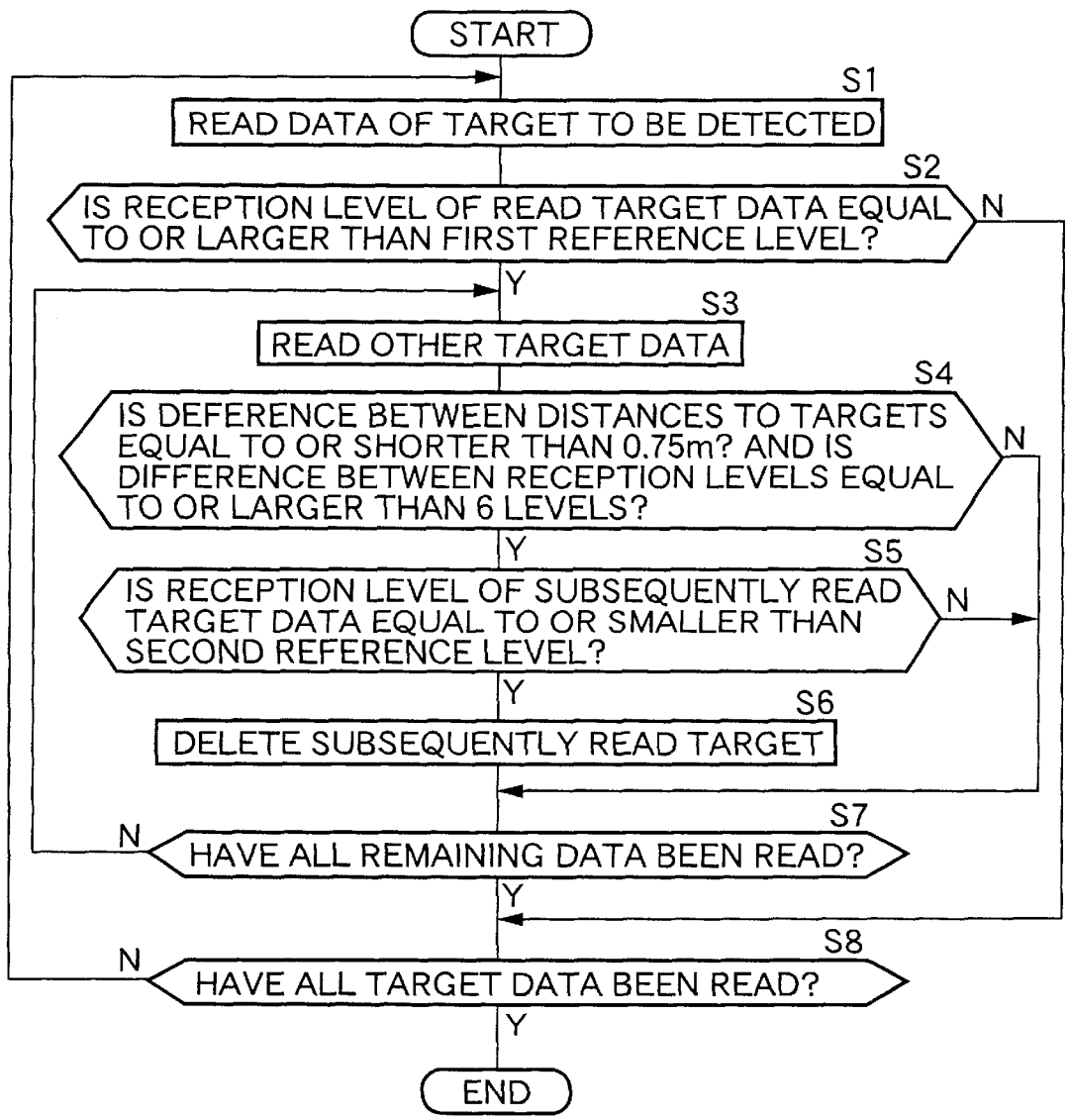

At Step S1 in the flow chart in FIG. 4, data of a target to be detected (an object which exists ahead of the vehicle and which is to be detected by the object detecting system) is read, and at Step S2, the reception level $L_1$ to $L_{16}$ of the read target data is compared with the first reference level $L_{REF1}$. If the reception level $L_1$ to $L_{16}$ is equal to or larger than the first reference level $L_{REF1}$, the processing is advanced to Step S3. At Step S3, another target data is read. At Step S4, it is determined whether a difference between the distance of the target data previously read at Step S1 and the distance of the target data subsequently read at Step S3 is equal to or shorter than 0.75 m, and the reception level $L_1$ to $L_{16}$ of the subsequently read target data is lower than the reception level $L_1$ to $L_{16}$ of the previously read target data by six levels or more. At Step S5, it is determined whether the reception level $L_1$ to $L_{16}$ of the subsequently read target data is equal to or smaller than the second reference level $L_{REF2}$. If the answer at Step S4 is YES and the answer at Step 5 is YES, it is determined at Step S6 that the subsequently read target data is a virtual image of the previously read target data, whereby the subsequently read target data is deleted.

Then, at Step S7, Steps S3 to S6 are repeatedly carried out, until all other remaining target data is read, and further, at Step S8, Steps S1 to S7 are repeatedly carried out, until all the target data is read in such a manner that the first target data is sequentially exchanged.

Figure 5:
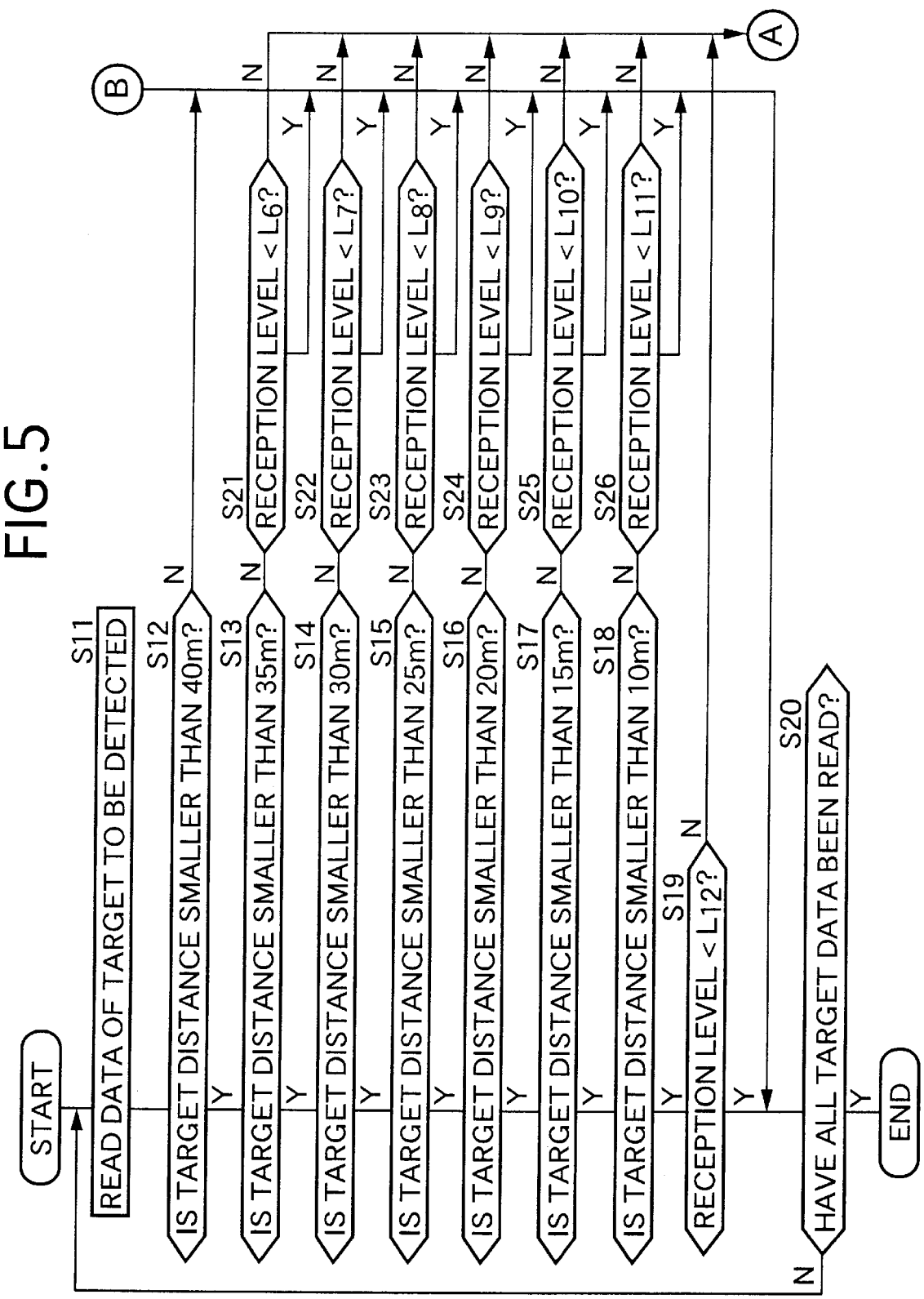
Figure 6:
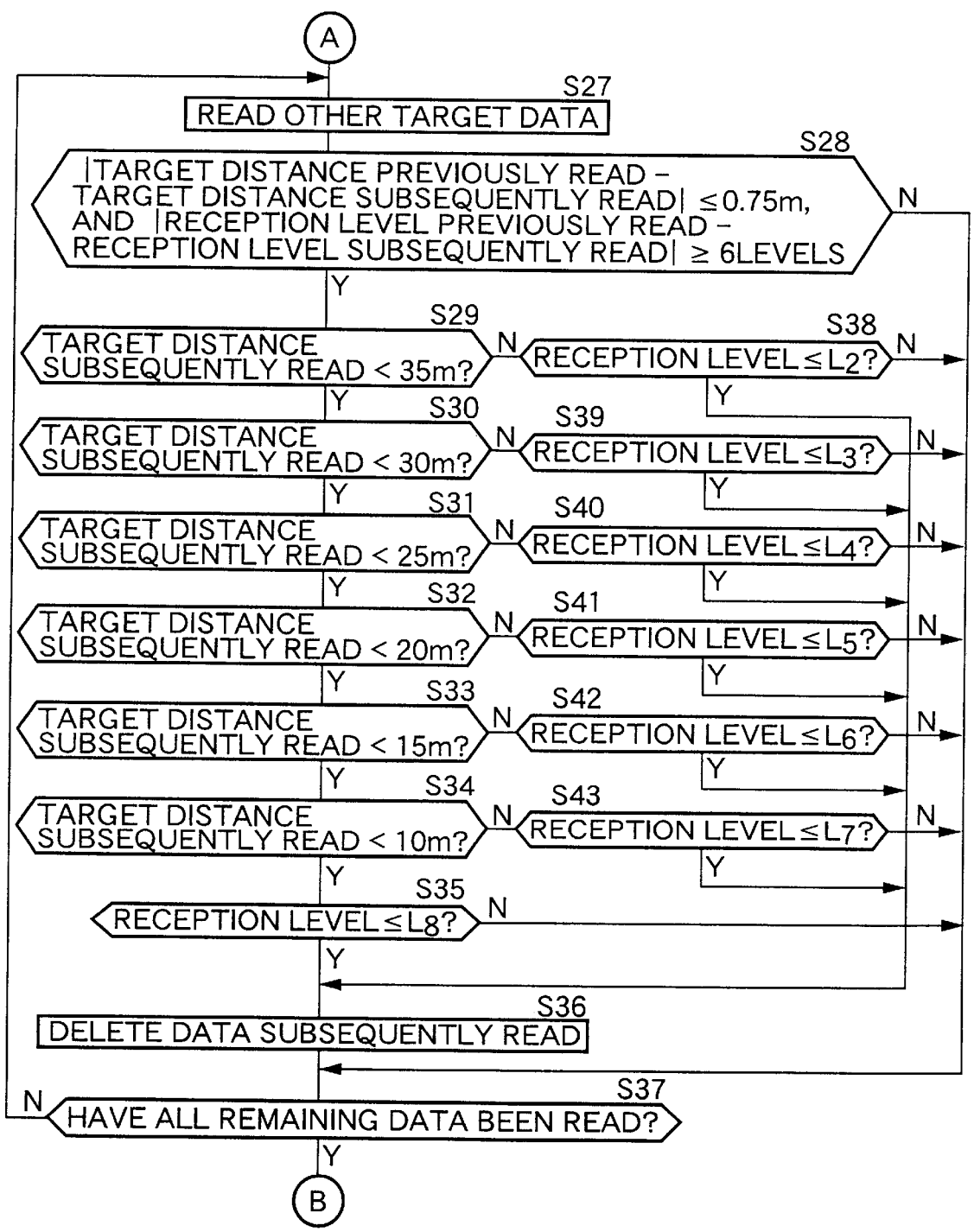
Figure 7:
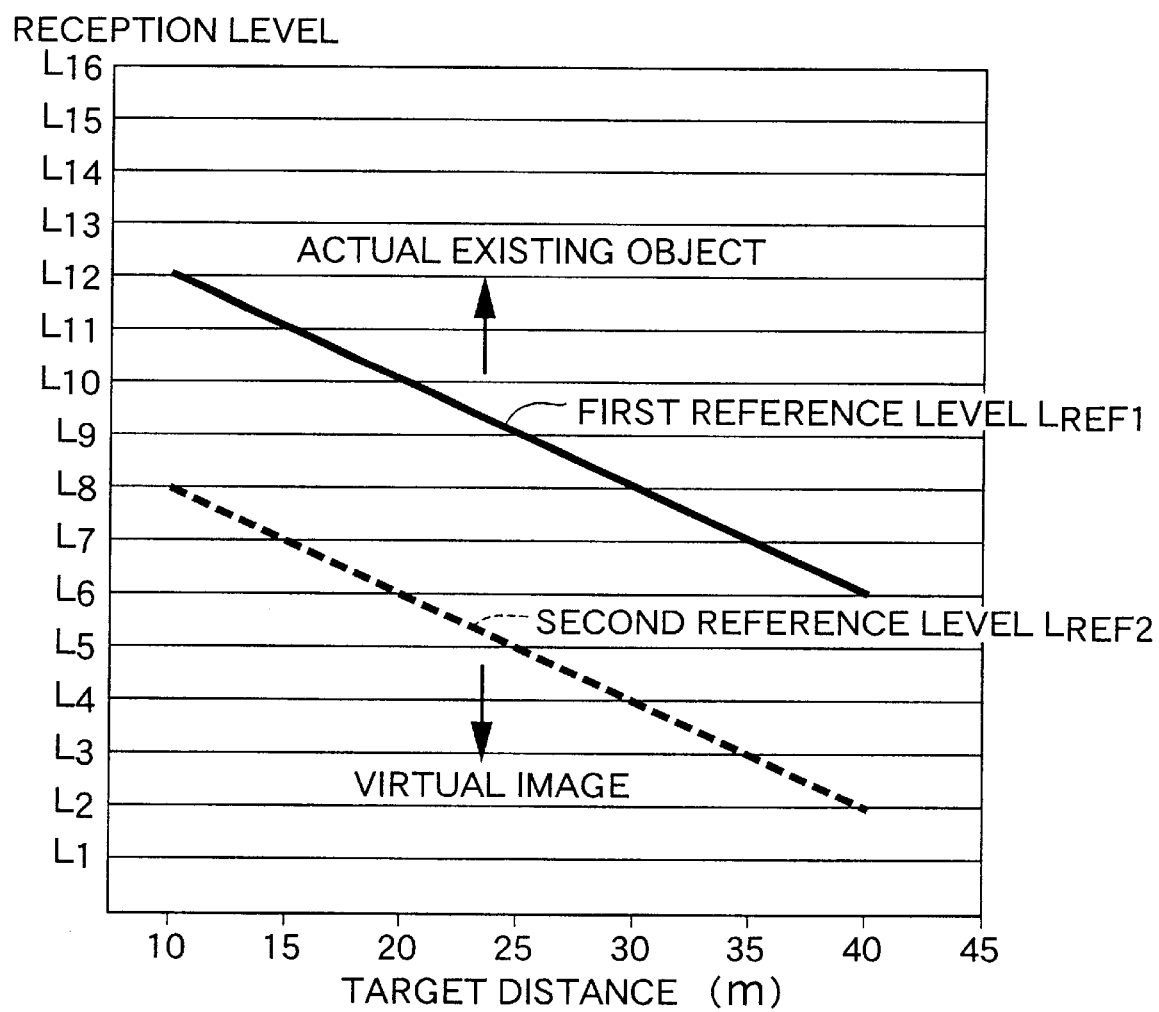

At Step S11 in the flow charts in FIGS. 5 and 6, data of a target to be detected is first read. If such target distance is equal to or longer than 40 m at subsequent Step S12, there is not a possibility that this data is original data of a virtual image and hence, the processing is advanced to Step S20. When the answer at subsequent Step S13 is NO, i.e., the target distance is shorter than 40 m and equal to or longer 35 m, if the reception level is smaller than $L_6$ at Step S21, there is not a possibility that this data is original data of a virtual image and hence, the processing is advanced to Step S20. When the answer at Step S14 is NO, i.e., the target distance is shorter than 35 m and equal to or longer 30 m, if the reception level is smaller than $L_7$ at Step S22, there is not a possibility that this data is original data of a virtual image and hence, the processing is advanced to Step S20. When the answer at subsequent Step S15 is NO, i.e., the target distance is shorter than 30 m and equal to or longer than 25 m, if the reception level is smaller than $L_8$ at Step S23, there is not a possibility that this data is original data of a virtual image and hence, the processing is advanced to Step S20. When the answer at subsequent Step S16 is NO, i.e., the target distance is shorter than 25 m and equal to or longer than 20 m, if the reception level is smaller than $L_9$ at Step S24, there is not a possibility that this data is original data of a virtual image and hence, the processing is advanced to Step S20. When the answer at subsequent Step S17 is NO, i.e., the target distance is shorter than 20 m and equal to or longer than 15 m, if the reception level is smaller than $L_{10}$ at Step S25, there is not a possibility that this data is original data of a virtual image and hence, the processing is advanced to Step S20. When the answer at subsequent Step S18 is NO, i.e., the target distance is shorter than 15 m and equal to or longer than 10 m, if the reception level is smaller than $L_1$, at Step S26, there is not a possibility that this data is original data of a virtual image and hence, the processing is advanced to Step S20. When the answer at subsequent Step S18 is YES, i.e., the target distance is shorter than 10 m, if the reception level is smaller than $L_{12}$ at Step S19, there is not a possibility that this data is original data of a virtual image and hence, the processing is advanced to Step S20.

On the other hand, if the answer at any one of Steps S21 to S26 and S19 is NO, namely if the reception level is equal to or larger than the first reference level $L_{REF1}$, there is a possibility that such target data is original data of a virtual image and hence, the processing is advanced to Step S27.

First, at Step S27, other target data is read. If the following condition is not established at subsequent Step S28: the difference between the distance of the target data previously read at Step S11 and the distance of the target data subsequently read at Step S27 is equal to or shorter than 0.75 m, and the difference between the reception level of the previously read target data and the reception level of the subsequently read target data is equal to or larger than a predetermined value (second predetermined value) $)L_{REF}$ (six levels), there is not a possibility that such target data is a virtual image and hence, the processing is advanced to Step S37.

When the answer at Step S29 is NO, i.e., the target distance is equal to or longer than 35 m even if the condition at Step S28 has been established, if the reception level is not equal to or smaller than $L_2$, there is not a possibility that such target data is a virtual image and hence, the processing is advanced to Step S37. When the answer at Step S30 is NO, i.e., the target distance is equal to or longer than 30 m and shorter than 35 m, if the reception level is not equal to or smaller than $L_3$ at Step S39, there is not a possibility that such target data is a virtual image and hence, the processing is advanced to Step S37. When the answer at Step S31 is NO, i.e., the target distance is equal to or longer than 25 m and shorter than 30 m, if the reception level is not equal to or smaller than $L_4$ at Step S40, there is not a possibility that such target data is a virtual image and hence, the processing is advanced to Step S37. When the answer at Step S32 is NO, i.e., the target distance is equal to or longer than 20 m and shorter than 25 m, if the reception level is not equal to or smaller than $L_5$ at Step S41, there is not a possibility that such target data is a virtual image and hence, the processing is advanced to Step S37. When the answer at Step S33 is NO, i.e., the target distance is equal to or longer than 15 m and shorter than 20 m, if the reception level is not equal to or smaller than $L_6$ at Step S42, there is not a possibility that such target data is a virtual image and hence, the processing is advanced to Step S37. When the answer at Step S34 is NO, i.e., the target distance is equal to or longer than 10 m and shorter than 15 m, if the reception level is not equal to or smaller than $L_7$ at Step S43, there is not a possibility that such target data is a virtual image and hence, the processing is advanced to Step S37. When the answer at Step S34 is YES, i.e., the target distance is shorter than 10 m, if the reception level is not equal to or smaller than $L_8$ at Step S35, there is not a possibility that such target data is a virtual image and hence, the processing is advanced to Step S37.

On the other hand, if the answer at any one of the Steps S38 to S43 and S35 is YES, namely, if the reception level is equal to or smaller than the second reference level $L_{REF2}$, it is determined that the target data is a virtual image, and such target data is deleted at Step S36. Then, at Step S37, Steps S27 to S43 are repeatedly carried out, until all other remaining target data are read.

In the embodiment, it is determined that an object having all the following conditions is a virtual image:

(1) the object is at a distance equivalent to the distance to an existing object;

(2) the reception level of the reflected wave is smaller than the reception level of the actual existing object by $)L_{REF}$; and (3) the reception level of the reflected wave is smaller than the second reference level $L_{REF2}$.

However, it may be determined that an object having only the conditions (1) and (2) is a virtual image. In this case, a block M5 in FIG. 3 includes "a third discriminating means" and "a virtual image determining means". Also it may be determined that an object having only the conditions (1) and (3) is a virtual image.

In the embodiment, the predetermined value $)L_{REF}$ and the second predetermined value $)L_{REF}$ are set at a value corresponding to six levels. However, these predetermined values need not be equal to each other and may be set at any values, respectively.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An object detecting system for detecting the presence of an object by transmitting an electromagnetic wave and receiving a reflected wave resulting from the reflection of the electromagnetic wave from the object, comprising a first discriminating means for discriminating an object having a reflected wave with a reception level equal to or larger than a first reference level, a second discriminating means for discriminating an object existing at a distance equal to the distance to the object discriminated by said first discriminating means, and having a reflected wave with a reception level equal to or smaller than a second reference level, and a virtual image determining means for determining the object discriminated by said second discriminating means as a virtual image of the object discriminated by said first discriminating means.

2. An object detecting system according to claim 1, wherein the first reference level of said first discriminating means is set larger than the second reference level of said second discriminating means.

3. An object detecting system according to claim 1, wherein the first reference level of said first discriminating means is set such that the first reference level becomes smaller as the distance to an object becomes larger.

4. An object detecting system according to claim 2, wherein the first reference level of said first discriminating means is set such that the first reference level becomes smaller as the distance to an object becomes larger.

5. An object detecting system according to claim 1, wherein the second reference level of said second discriminating means is set such that the second reference level becomes smaller as the distance to an object becomes larger.

6. An object detecting system according to claim 2, wherein the second reference level of said second discriminating means is set such that the second reference level becomes smaller as the distance to an object becomes larger.

7. An object detecting system according to claim 3, wherein the second reference level of said second discriminating means is set such that the second reference level becomes smaller as the distance to an object becomes larger.

8. An object detecting system according to claim 4, wherein the second reference level of said second discriminating means is set such that the second reference level becomes smaller as the distance to an object becomes larger.

9. An object detecting system according to claim 1, wherein said virtual image determining means conducts the determination for an object, when the distance to the object is shorter than a predetermined value.

10. An object detecting system according to claim 2, wherein said virtual image determining means conducts the determination for an object, when the distance to the object is shorter than a predetermined value.

11. An object detecting system according to claim 3, wherein said virtual image determining means conducts the determination for an object, when the distance to the object is shorter than a predetermined value.

12. An object detecting system according to claim 4, wherein said virtual image determining means conducts the determination for an object, when the distance to the object is shorter than a predetermined value.

13. An object detecting system according to claim 5, wherein said virtual image determining means conducts the determination for an object, when the distance to the object is shorter than a predetermined value.

14. An object detecting system according to claim 6, wherein said virtual image determining means conducts the determination for an object, when the distance to the object is shorter than a predetermined value.

15. An object detecting system according to claim 7, wherein said virtual image determining means conducts the determination for an object, when the distance to the object is shorter than a predetermined value.

16. An object detecting system according to claim 8, wherein said virtual image determining means conducts the determination for an object, when the distance to the object is shorter than a predetermined value.

17. An object detecting system for detecting the presence of an object by transmitting an electromagnetic wave and receiving a reflected wave resulting from the reflection of the electromagnetic wave form the object, comprising:

a first discriminating means for discriminating an object having a reflected wave with a reception level equal to or larger than a first reference level, a second discriminating means for discriminating an object existing at a distance equal to the distance of said object discriminated by the first discriminating means and having a reflected wave with a reception level smaller than the reception level of said object, by a predetermined value, and a virtual image determining means for determining the object discriminated by said second discriminating means is a virtual image of the object discriminated by said first discriminating means.

18. An object detecting system for detecting the presence of an object by transmitting an electromagnetic wave and receiving a reflected wave resulting from the reflection of the electromagnetic wave from the object, comprising:

a first discriminating means for discriminating an object having a reflected wave with a reception level equal to or larger than a first reference level, a second discriminating means for discriminating an object existing at a distance equal to the distance to the object discriminated by said first discriminating means and having a reflected wave with a reception level smaller than the reception level of said object by a second predetermined value and equal to or smaller than a second reference level, and a virtual image determining means for determining the object discriminated by said second discriminating means as a virtual image of the object discriminated by said first discriminating means.

19. An object detecting system according to claim 1, 17, or 18, further comprising:

a virtual image deleting means for deleting the object determined as the virtual image by said virtual image determining means from the results of the recognition provided by said first and second discriminating means.

* * * * *